Patented May 26, 1936

2,042,259

UNITED STATES PATENT OFFICE 2,042,259

METHOD OF PURIFYING AMINOARSENO-BENZENES

Stanislaw Kielbasinski, Warsaw, Poland

No Drawing. Application February 16, 1932, Serial No. 593,421. Renewed April 13, 1936. In Germany May 19, 1931

5 Claims. (Cl. 260—15)

The object of this invention is to purify aminoarsenobenzenes from toxic by-products.

It is well known that the amino compounds of arsenobenzene, as well as derivatives thereof, are either wholly insoluble or only partially soluble in organic solvents, more particularly alcohols. This fact makes work with these compounds very difficult.

It has now been found that the bases can be converted into solutions whilst the partly very toxic impurities or secondary compounds contaminated therewith from the manufacture do not go into solution at all and can be separated off.

The preparation of the solutions, which are to be regarded as pseudo-solutions, is effected, for example, by rubbing up the free bases very finely by means of a suitable mill in an organic suspension agent, preferably an alcohol which is miscible with water.

The bases may also be suspended in an organic suspension agent, preferably in water-miscible alcohols, which, like ethyl alcohol or methyl alcohol, dissolve the salts of the bases, brought into solution by means of an acid and then a neutralization effected by cautious addition of an alkali, as a result of which the bases remain in pseudo-solution. Small quantities of the bases then separate out together with the toxic by-products.

The process provided by the invention is pre-eminently suited for the purification of technical dihydroxydiamino-arsenobenzene, but it can also be used for purifying other aminoarsenobenzene bases (alkyl, aryl, amino, hydroxy, or halogen substitution products of arsenobenzene). Salts, formaldehyde sulphoxylates, aminoarsonic acids, etc. can then be obtained from the purified bases.

Example 1

1 mol. of freshly filtered off and still wet dihydroxydiamino-arsenobenzene is introduced with stirring into 5 litres of alcohol in which 1 mol. of hydrogen chloride has been dissolved. The solution, which can be filtered if desired for clarification purposes, is gradually neutralized while thoroughly stirring with 2N soda lye or even an aqueous solution of sodium carbonate. During this gradual neutralization the free base of dihydroxydiamino-arsenobenzene remains almost completely in solution and only a relatively small quantity of a flocculent precipitate is formed, which falls to the bottom and carries the toxic by-products with it. The neutral solution of free base which is filtered off can be used for making arsenobenzene compounds which are now characterized by the freedom from toxic by-products. From the solution of the purified base, for example, the sodium formaldehyde-sulphoxylate or the formaldehyde-bisulphite compound can be readily obtained.

Example 2

1 mol. of 4,4'-diaminoarsenobenzene, made by reduction of aminophenyl-arsineoxide or of arsanilic acid, is suspended in 10 litres of ethyl alcohol after rubbing down under alcohol in a mortar, and then 1 mol. of alcoholic hydrogen chloride is added thereto. The solution formed is neutralized while stirring rapidly without filtering off the undissolved deposit, 2N caustic soda being allowed to flow in in a thin stream. The precipitate remaining undissolved in hydrogen chloride is now increased by a voluminous precipitation, which contains small quantities of the amino-arsenobenzene base and more particularly all the undesirable by-products; the free base remains in the solution in a yield which is about 70% of the theoretical. After filtration from the insoluble residues, the clear solution obtained is acidified with hydrogen chloride and treated with five times the volume of ether, as a result of which the yellow hydrogen chloride of diaminoarsenobenzene is separated out. The solution of diaminoarsenobenzene base separated from the said impurities may also be used directly for other reactions.

What I claim is:—

1. A method of purifying aminoarsenobenzenes from toxic by-products consisting in suspending the free base of the arsenic compound in saturated lower aliphatic alcohols, converting the suspension into a solution by addition of hydrochloric acid, neutralizing the solution by cautious addition of alkali whereby a pseudo-solution of the free base is produced, and separating off the undissolved toxic by-products from said pseudo-solution.

2. A method of purifying aminoarsenobenzenes from toxic by-products consisting in suspending the free base of the arsenic compound in a water-miscible alkyl alcohol, converting the suspension into a solution by addition of hydrochloric acid, neutralizing the solution by cautious addition of alkali whereby a pseudo-solution of the free base is produced, and separating off the undissolved toxic by-products from said pseudo-solution.

3. A method of purifying aminoarsenobenzenes from toxic by-products consisting in dissolving the free base of the arsenic compound in saturated lower aliphatic alcohols to which hydrochloric acid has been added, neutralizing the solution by cautious addition of alkali whereby a pseudo-solution of the free base is produced, and separating off the undissolved toxic by-products from said pseudo-solution.

4. A method of purifying aminoarsenobenzenes from toxic by-products consisting in dissolving the free base of the arsenic compound in a water-miscible alkyl alcohol to which hydrochloric acid has been added, neutralizing the solution by cautious addition of alkali whereby a pseudo-solution of the free base is produced, and separating off the undissolved toxic by-products from said pseudo-solution.

5. A method of purifying aminoarsenobenzenes from toxic by-products, consisting in suspending the impure aminoarsenobenzene in a lower aliphatic alcohol in the presence of a strong mineral acid, neutralizing the mixture by cautious addition of alkali whereby a pseudo-solution of the aminoarsenobenzene is produced, and separating off the undissolved toxic by-products.

STANISLAW KIELBASINSKI.